United States Patent [19]
Carlson et al.

[11] 3,872,427
[45] Mar. 18, 1975

[54] MOTOR VEHICLE LIGHT GUARD

[76] Inventors: Richard L. Carlson, P.O. Box 680;
William L. Richardson, 33023 56th South, both of Auburn, Wash. 98002

[22] Filed: Mar. 5, 1974

[21] Appl. No.: 448,332

Related U.S. Application Data

[63] Continuation of Ser. No. 301,709, Oct. 30, 1972.

[52] U.S. Cl............................ 340/52 D, 200/144 B
[51] Int. Cl.............................................. B60q 1/00
[58] Field of Search........ 340/52 D, 52 R, 52 F, 71, 340/60; 200/81.9 R, 144 B, DIG. 29; 315/82

[56] References Cited
UNITED STATES PATENTS

| | | | |
|---|---|---|---|
| 2,501,867 | 3/1950 | Gleisen | 340/60 UX |
| 2,666,197 | 1/1954 | Polymeros | 340/60 X |
| 2,773,249 | 12/1956 | De Santis | 340/52 D |
| 3,639,898 | 2/1972 | Booth | 340/71 |

*Primary Examiner*—Alvin H. Waring
*Attorney, Agent, or Firm*—Morris A. Case

[57] ABSTRACT

The interior of a non-conducting housing is in communication with the intake manifold of an engine. A ball movable inside the housing contacts the terminals of wires at least one of which communicates with a light terminal and a second wire extends to a sounding device to sound an alarm if a light circuit is energized when the engine is not running. Vacuum from the intake manifold moves the ball out of contact with the terminals when the motor is running.

7 Claims, 10 Drawing Figures

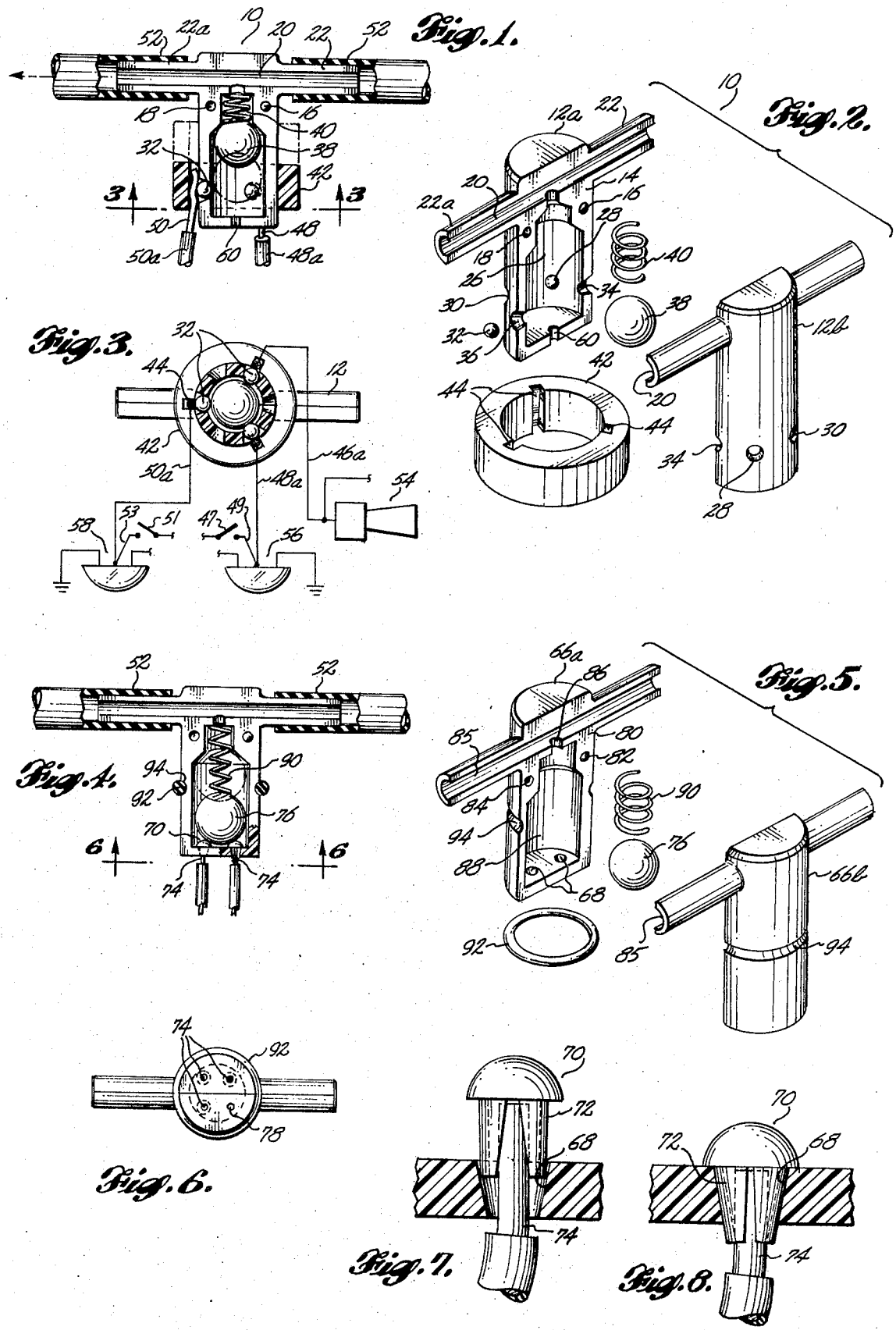

MOTOR VEHICLE LIGHT GUARD

This is a continuation, of application Ser. No. 301,709, filed Oct. 30, 1972.

SUMMARY OF THE INVENTION

A vacuum operated electrical switch is placed in a circuit between the horn and a light of a motor vehicle. Electrical energy to the light also passes through the switch to the horn to sound the alarm. The switch is connected to a suction line of the engine manifold which opens the switch due to the vacuum created by the engine when in operation.

The switch has a vacuum bypass which gives it a Y or a tee shape. The top of the tee is a tube sized to fit into an engine vacuum line at each of its ends. The trunk of the tee forms a housing and is of a non-conducting material, is hollow to accommodate a movable ball which conducts electricity across the terminals of the switch and has an opening between the tube and the inside of the housing to allow the vacuum to move the ball away from the terminals to break the circuit.

An object of this invention is to provide an easily installed device to warn when lights are left on a motor vehicle when the motor is off.

Another object is to provide a method of sounding a warning when a motor vehicle lights are on and the motor is off.

BRIEF DESCRIPTION OF THE DRAWINGS

FIG. 1, is a side elevation partially sectionalized, looking into the back half of a vacuum switch.

FIG. 2, is an exploded perspective view of the vacuum switch of FIG. 1.

FIG. 3, is a sectional view taken along lines 3—3 of FIG. 1, and including a schematic of a vehicle horn and a high beam and a low beam headlight.

FIG. 4, is a side elevation partially sectionalized, looking into the back half of a variation of a vacuum switch.

FIG. 5, is an exploded perspective view of the vacuum switch of FIG. 4.

FIG. 6, is a sectional view taken along lines 6—6 of FIG. 4.

FIG. 7, is a side elevation showing a wire inserted into a split rivet prior to driving the rivet into a hole in the housing.

FIG. 8, shows the rivet, wire and housing of FIG. 7, with the rivet driven into position.

DETAILED DESCRIPTION

Figure 9:
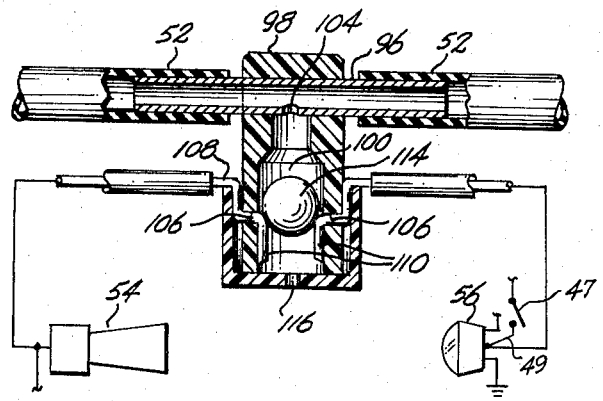
FIG. 9, shows a side elevation, partially in section, looking into the back half of another variation of a vacuum switch connected to a schematic view of a vehicle horn and a headlight.
Figure 10:
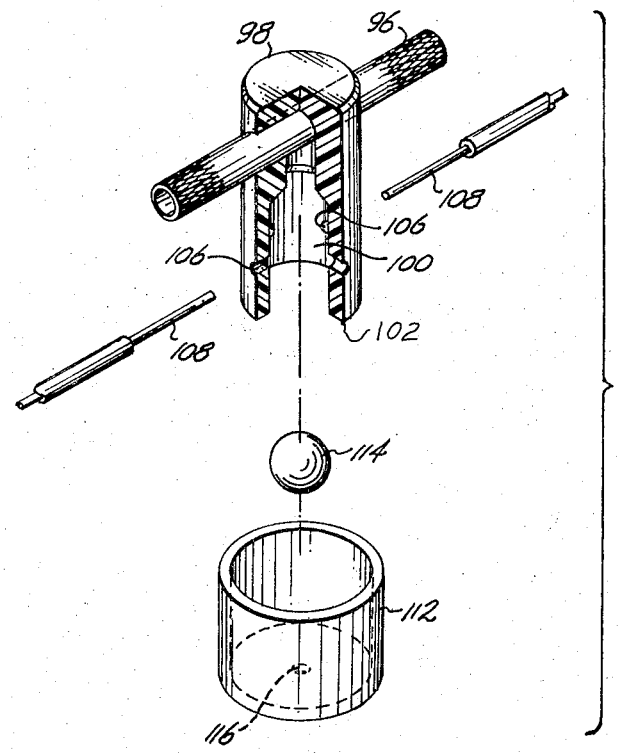
FIG. 10, shows an exploded perspective view of the vacuum switch shown in FIG. 9.

In one preferred embodiment as shown in FIGS. 1, 2, and 3, a vacuum actuated electrical switch 10, has a non-conductive housing 12, split into two equal and matching molded parts 12a, and 12b, which when joined together make up the housing 12. Parts 12a, and 12b, may have slight variations but in this embodiment these parts are identical; which effects a savings in tooling costs. Part 12a, has face 14, with projection 16, and recess 18, and the projection and recess serve as an indexing device to keep the two halves in alignment when joined. A recess 20, extends from arm 22, through arm 22a, and has opening 24, leading into the hollow interior 26, of the part. Openings 28, and 30, are tapered and one sized to accept a metallic ball 32, from the outside of the housing such that when positioned part of the ball extends inside and part extends outside the housing. In housing 12, opening 36, from 12a, and opening 34, from 12b, combine to form an opening sized exactly like openings 28, and 30. A ball 38, that is a conductor of electricity is placed inside the housing 12, and a spring 40, may be used. A non-conducting ring 42, has tapered grooves 44.

To assemble parts 12a, and 12b, are placed together to form housing 12, with ball 38, and spring 40, positioned inside. Next the ring 42, is positioned as shown in phantom with the grooves 44, having the narrow part of the taper up. Metallic balls 32, are positioned in openings with wires 46, 48, and 50 contacting the balls. These wires are covered with insulation between terminals as shown in 46a, 48a, and 50a. The ring is pulled down and the taper in the grooves locks the metallic balls in position with the exposed ends of the wires held firmly against the metallic balls which extend into the housing to act as electrodes or terminals. Not all the openings for receiving metallic balls need be used as the positioned ring covers the unused holes. In this embodiment three equally spaced openings are used and three of the openings are not used. Of course the housing may be manufactured having only two or three openings as desired. Additional openings were made in this embodiment because parts 12a, and 12b, are identical to effect a cost savings.

To install the device an existing hose line 52, leading to the suction inlet of a motor vehicle is cut and the joined arms 22, and 22a, inserted into the cut suction lines. Conductive wire 46, is connected to a sounding device 54. One of the wires say 48, is connected to the terminal of a high beam headlight 56, and the other wire 50, to a low beam headlight 58. When a headlight is left on while the motor is off, electrical energy to the headlight travels through either switch 47, and wire 49, or switch 51, and wire 53, whichever switch is left on, thence through the vacuum type switch, when the motor is off as the conductive ball 38, contacts the metallic balls 32, due to action of spring 40, to close the circuit to the sounding device. The sounding device may be a buzzer or it may be the motor vehicle's horn. When the motor is running vacuum from the engine pulls the ball off the terminals to break the electrical circuit. Hole 60, allows air to be sucked into the housing to facilitate movement of the conductive ball.

In another preferred embodiment shown in FIGS. 4, through 8, the non-conducting housing 66, is split into two identical molded parts 66a, and 66b, which when joined form housing 66. Each part has a pair of openings 68, and as best shown in FIGS. 7, and 8, and is tapered from large to small from inside out. A rivet 70, having a split shank 72, is driven through the tapered opening from the inside out after a wire 74, is inserted between the two sides of the shank to tightly fasten to the wire. In this embodiment three of the holes are used with attached rivets fastened to conductive wire as contacts for conductive ball 76, and the other hole is left open to permit the entry of air as shown at 78, in FIG. 6. Parts 66a, and 66b, have face 80, with projection 82, and recess 84, where the projections and the recess serve as an indexing device to keep the two halves in alignment. A recess 85, extends transversely and opening 86, leads to the hollow inside 88, of the part. This embodiment is assembled by first fastening wire 74, to rivet shank 72, and driving the rivet 70, into engagement in each of three of the openings 68. Next a conductive ball 76, and spring 90, if desired is placed inside and parts 66a, and 66b, joined. A resilient O-ring 92, is placed in groove 94, to hold the parts together. This device is affixed to a motor vehicle in the same manner as set out above for the previous embodiment.

In yet another preferred embodiment a tube 96, extends through and is fastened to a non-conductive housing 98. The housing is recessed 100, from one end 102. An opening 104, in the tube communicates with the recess in the housing. Holes 106, in the housing accept conductive wires 108, which extend into the housing and are bent down at 110, to act as an electrode or terminal. The wires are held in place by open ended non-conductive cylinder 112, which is sized to encase the end of housing closely enough to be fastened to the housing due to jamming the wire between the housing and the cylinder. A conductive ball 114, is placed inside the recess of the housing prior to fastening the wires. The ball contacts the wire terminals when at rest and moves out of contact when a vacuum is introduced from motor vehicle suction line 52. Hole 116, is placed in cylinder 112, to permit air to enter the housing when a vacuum is applied.

In this view just two wires are shown with one wire extending to a horn 54, and the other to a headlight 56. Three wires may be used to be able to control both the high and the low beam circuits on the headlight.

Having specifically described out invention, it should be noted that various modifications may be resorted to by one skilled in the art without departing from the teaching of the invention.

I claim:

1. An improved device for use on a motor vehicle to sound an alarm if the vehicle's lights are on while the motor is off, said device being used in combination with a motor vehicle, vehicle lights, motor vehicle vacuum and an alarm wherein the improvement comprises: a tee shaped housing to include a pair of non-conductive molded parts joined together, said housing having a hollow trunk and communicating hollow laterally extending arms, and said trunk having a plurality of openings; a plurality of electrodes extending through the openings, said electrodes comprisng conductive balls extending partly inside and partly outside the housing; a non-conductive ring having interior tapered slots spaced to hold the electrodes in the openings; a conductive ball movable within the hollow trunk and contacting the electrodes; means for communicating between the hollow trunk and the motor's vacuum system to allow the vacuum to move the ball away from the electrodes; means for connecting a first electrode to the alarm; and means for connecting a second electrode to the vehicle lights.

2. An improved device as in claim 1 wherein the improvement further comprises: connecting the second electrode to a highbeam of a headlight, and means for connecting a third electrode to a lowbeam of a headlight.

3. An improved device for use on a motor vehicle to sound an alarm if the vehicle lights are on while the motor is off, said device being used in combination with a motor vehicle, vehicle lights, motor vehicle vacuum and an alarm, wherein the improvement comprises: a tee shaped housing to include a pair of non-conductive molded parts joined together, said housing having a hollow trunk and communicating hollow laterally extending arms, and said trunk having a plurality of tapered openings; a plurality of electrodes extending through the openings, said electrodes comprise a rivet extending through a tapered opening in the housing with a head on the inside and a split shank holding a circuit wire on the outside; means for maintaining the pair of non-conductive molded parts together; a conductive ball movable within the hollow trunk and contacting the electrodes; means for communicating between the hollow trunk and the motor's vacuum to allow the vacuum to move the ball away from the electrodes; means for connecting a first electrode to the vehicle light circuit; and means for connecting a second electrode to a sounding device to sound an alarm if the light circuit is energized when the engine is not running.

4. An improved device as in claim 3 wherein the means for connecting the first electrode to the vehicles light circuit includes connection to a highbeam of the vehicle headlights, and the improvement further comprises means for connecting a third electrode to a lowerbeam of the vehicle headlights.

5. An improved device as in claim 4 wherein the sounding device is the vehicle horn.

6. An improved device for use on a motor vehicle to sound an alarm if the vehicle lights are on while the motor is off, said device being used in combination with a motor vehicle, vehicle lights, motor vehicle vacuum and an alarm circuit wherein the improvement comprises: a non-conductive housing recessed from one end and having openings into the recess, a tube extending through the housing, a plurality of terminal wires extending through the openings, an open ended non-conductive cylinder positioned to encircle the housing from the recessed end and joined thereto by terminal wires jammed therebetween, a conductive ball movable within the housing in contact with the terminals, means for communicating between the recess, tube and motor vacuum to allow vacuum to enter and move the ball away from the terminals when the motor is on, means for connecting a terminal to a sounding device, and means for connecting at least one other terminal to a light on the vehicle.

7. An improved device as in claim 6 wherein the sounding device is the vehicle horn.

* * * * *